Dec. 15, 1970 R. W. ANTHONY ET AL 3,546,760

GEAR SHAVING CUTTER

Original Filed Nov. 21, 1967

INVENTORS
RUSSELL W. ANTHONY
WARREN C. McNABB

BY Whittemore, Hulbert
& Belknap

ATTORNEYS 3,546,760
GEAR SHAVING CUTTER
Russell W. Anthony and Warren C. McNabb, Detroit,
Mich., assignors to Lear Siegler, Inc., Santa Monica,
Calif., a corporation of Delaware
Original application Nov. 21, 1967, Ser. No. 684,796.
Divided and this application Nov. 20, 1969, Ser. No.
878,379
Int. Cl. B26d 1/12
U.S. Cl. 29—103                                              6 Claims

ABSTRACT OF THE DISCLOSURE

A gear shaving cutter in the form of a steel gear having its teeth provided with a plurality of slots separating each tooth into a plurality of axially separated blades, the space between the blades of each tooth being substantially filled with a plastic material preferably yieldable and resilient, bonded to the adjacent side surfaces of the blades and supporting them against lateral thrust.

CROSS-REFERENCE TO RELATED APPLICATION

The present application is a division of applicants' prior copending application Ser. No. 684,796, filed Nov. 21, 1967.

FIELD OF THE INVENTION

The invention relates to gear shaving in which a gear is rotated in tight mesh with a gear-like shaving cutter, the teeth of the cutter being provided with a plurality of cutting edges, the helix angle of the cutter being related to the helix angle of the gear such that the gear and tool mesh with their axes crossed at a moderate angle as for example, about 12 degrees. As a result of crossed axes slide, the cutting edge removes chips from the surface of the gear teeth. Preferably, a relative traverse is provided between the gear and tool in a plane which is parallel to the axes of both the gear and tool. This traverse may be in a direction parallel to the axis of the gear or it may be oblique thereto but not parallel to the axis of the tool. Apparatus for performing this gear finishing operation is disclosed in Drummond Pat. 2,157,981, and details of cutters useful in this operation are shown in Drummond Pat. 2,126,178.

DESCRIPTION OF THE PRIOR ART

Praeg Pat. 2,686,956 discloses a gear shaving cutter in the form of a gear having teeth slotted completely therethrough to form blades which are separated and spaced axially of the tool. In this case the relatively thin blades are given lateral support by means of washers interposed between the teeth, each tooth being provided with a longitudinally extending pin passing through openings in the teeth through central openings in the washers.

SUMMARY OF THE INVENTION

In accordance with the present invention the teeth of the gear shaving cutter are slotted completely therethrough leaving relatively thin blade portions which are separated or spaced apart axially of the tool, or longitudinally of the teeth. In order to provide for lateral support of these relatively weak blades and to prevent the relatively severe stresses imparted during gear shaving operations from breaking them off, the space between the adjacent blades is filled or substantially filled with a suitable resin, preferably one which is yieldable and highly resilient such as epoxy resin. The plastic material is introduced in fluid phase and is thereafter caused to set and to become bonded to the adjacent surfaces at the sides of adjacent blades.

It is accordingly an object of the present invention to provide a gear shaving cutter having slotted teeth filled or substantially filled with a suitable plastic support material.

It is a further object of the present invention to provide a method of producing such shaving cutters.

It is a further object of the present invention to provide cutters of the character described in which the plastic material is recessed slightly inwardly from the side surfaces of the blades to expose the cutting edges and to provide a method for making such cutters.

Other objects and features of the invention will become apparent as the description proceeds, especially when taken in conjunction with the accompanying drawing, illustrating a preferred embodiment of the invention.

DETAILED DESCRIPTION

Figure 1:
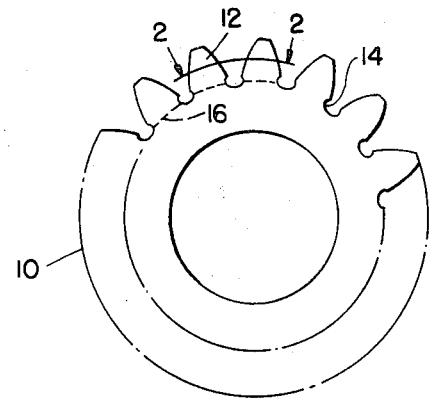
FIG. 1 is an elevational view of a gear shaving cutter constructed in accordance with the present invention.

Referring first to FIG. 1 the gear shaving cutter comprises a gear-like body 10 having a multiplicity of gear teeth 12, the teeth preferably being provided at their root spaces with rounded enlargements 14. In the past the side surfaces of the teeth have been grooved or serrated to an appreciable depth to provide cutting edges which were formed by the sides of the serrations or grooves and the side surfaces of the teeth.

In accordance with the present invention the teeth 10 of the cutter are slotted to substantially full depth, the bottoms of the slot being indicated in FIG. 1 at 16. It will be observed in this figure that the bottoms of the slots intersect the rounded enlargements at the roots of the teeth.

Gear shaving cutters of this type are formed of tool steel which requires heat treatment to form them into cutting tools. In accordance with the present invention the slots indicated at 16 in FIG. 2, may be formed prior to heat treatment of the cutter, and accordingly, these slots may be formed by a rapid and inexpensive sawing operation.

Figure 2:
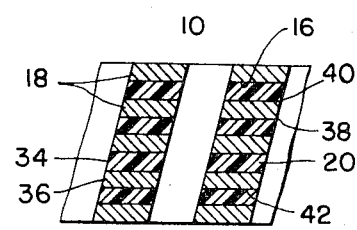
FIG. 2 is an enlarged sectional view through two teeth thereof, taken substantially on the line 2—2, FIG. 1.
Figure 6:
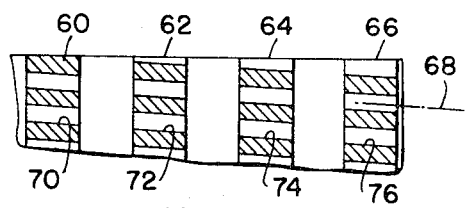
FIG. 6 is a view illustrating the tooth slots disposed to extend with a short lead.

As indicated in FIG. 2, each of the slots extends directly around the gear and hence occupies a plane perpendicular to its axis. However, it is within the contemplation of the present invention to provide the slots so as to extend at an angle as indicated in FIG. 6. Here it will be observed that the most nearly circumferentially aligned slots or ribs extend at a large helix angle or a slight lead.

In order to reinforce the blades 18 into which each of the cutter teeth is divided, the spaces between the blades is filled or substantially filled with a plastic material 20. This material is introduced in fluid form into the spaces between the blades and is thereupon caused to set. A suitable material for this purpose is an epoxy resin of the type disclosed in Praeg et al. Pat. 2,913,858. This material is caused to set by the addition of suitable curing agents and subsequent heating.

Inasmuch as any heat treatment of the steel cutter would destroy resin disposed in the slots of the teeth, it is of course essential that heat treatment of the tool take place prior to the insertion or application of the resin or plastic material. However, it is not essential that the teeth be formed. Thus for example, a cylindrical blank may be provided with circumferentially extending grooves or grooves which extend at a slight lead, after which the blank may be heat treated. Thereafter, the grooves may be filled with the resin in fluid form and the resin caused to set. Finally, the teeth may be formed in the blank from the solid by a grinding operation which of course is possible even after heat treatment. This method of production is most advantageous with fine pitch cutters.

A second method of applying the resin is to provide a blank provided with slotted teeth, to heat treat the blank, and thereafter to fill both the slots between the blade portions of the teeth and the complete tooth spaces with fluid resin. Afer the resin has set the resin in the tooth spaces may be ground out at the same time as the sides of the teeth are given a finish-grinding operation.

Figure 4:
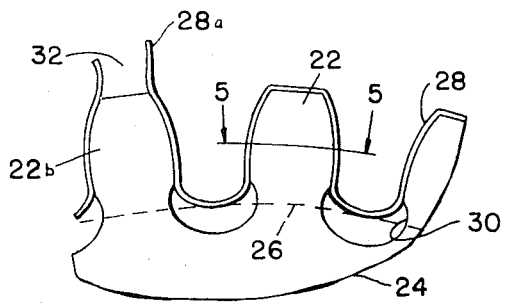
FIG. 4 is an enlarged elevational view showing the manner in which fluid plastic material may be introduced into the tooth slots.

Another method of introducing fluid plastic material into the slots between the blade portions of the teeth is illustrated in FIG. 4. Here, teeth 22 are provided on a heat treated blank 24 with grooves extending substantially the full height of the teeth, the bottoms of the grooves being indicated at 26. A suitable sheet material such for example as a fibrous material or paper, may be formed into the tooth spaces as illustrated to close the sides of the slots provided in the teeth. The application of the sheet material may be most conveniently accomplished by rolling the tool blank 24 in mesh with a gear having teeth conjugate to the teeth of the blank and adapted to press the sheet material 28 into the tooth spaces as shown. It will be observed that the sheet material or continuous strip is pressed against the edge surfaces of the blades and closes the spaces therebetween both at the sides and top thereof. However, the sheet material does not extend to the bottom of the rounded undercut portions 30 so that there is a passage for the flow of fluid plastic material circumferentially of the blank. The sheet material is continuous around the entire cutter body except that at a particular tooth, such as the tooth 22b, the ends of the strip as indicated at 28a are brought upwardly and form a guide and define a space 32 into which fluid plastic can be poured. The fluid plastic can be caused to flow in either or both directions around the cutter body through the bottom portions of the slots which are in communication with the openings 30. After the resin or fluid plastic material has filled the spaces, it is caused to set and the sheet or strip 28 is removed. This operation will of course leave the plastic material flush with the edge surfaces of the blades, a condition which is illustrated in FIG. 2. Here it will be observed that the edge surfaces 34 of the plastic filler material are co-extensive with the edge surfaces 36 of the blades 18.

A cutter in which the plastic material completely fills the spaces or slots between the blade portions is practical and capable of performing a cutting operation. It will be appreciated that cutting edges 38 and 40 are provided on each cutting blade by the intersection between the inner side surfaces 42 of the blades and the edge surfaces 36 thereof. In operation a cutter is in tight mesh under substantial pressure with the teeth of a work gear. Since the plastic material is yieldable and highly resilient, it may be displaced inwardly by the metal of the work gear to permit a cutting action to take place which removes the chip. After the cutting edge leaves contact with the work gear the plastic material will resiliently resume its initial position.

Further usage of the tool in some cases may result in appreciable wear of the plastic material to cause it to become recessed inwardly with respect to the side surfaces of the blades.

However, it is also possible to produce cutters in which in new condition the reinforcing plastic material is recessed inwardly.

Figure 5:
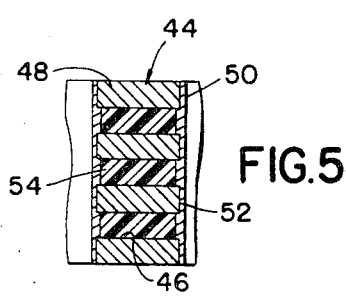
FIG. 5 is a fragmentary view on the line 5—5, FIG. 4, showing the recessing of the plastic material by use of compressible sheet material.

Referring to FIG. 5 there is shown a tooth 44 provided with slots 46 separating the tooth into a plurality of blades 48. The cutting blank having such teeth is provided with a strip 50 similar to the strip 28 disclosed in FIG. 4. In this case however, the strip may be of appreciable thickness and slightly compressible as for example, a relatively soft thick paper material. This material may be rolled into position by a gear as described in connection with the embodiment of the invention illustrated in FIG. 4, with the result that the portions of the sheet material 50 which overlie the edges of the blades 48 as illustrated at 52, are substantially compressed, whereas the relatively thick sheet material or strip which overlies the slots 46 is uncompressed and is displaced inwardly into the slots. Thus, when the slots are filled the plastic material as indicated at 54 is recessed inwardly.

Figure 3:
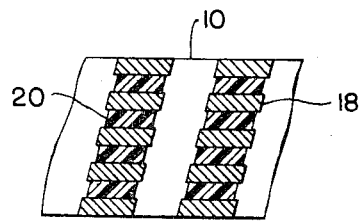
FIG. 3 is a view similar to FIG. 2, but showing the plastic material recessed inwardly from the sides of the teeth.

Referring now to FIG. 3 there is shown the finished product of the method described in conjunction with FIG. 5, except that in this case the teeth are disclosed as extending at a small helix.

Referring now to FIG. 6 there is diagrammatically illustrated an arrangement in which the slotting of the teeth is accomplished at a lead so that the cutting edges on consecutive teeth are not in alignment. In this figure, the slotted teeth are indicated at 60, 62, 64 and 66, being four consecutive teeth of a large sequence of teeth. One slot is indicated which extends along a helical line 68. It will be observed that in a succession of four teeth, the grooves 70, 72, 74 and 76 advance axially of the cutter (or longitudinally of the teeth) a distance equal to the width of a single groove. Thus, the tooth segments illustrated in FIG. 6 at the sides of the slot extending along the line 68, are the most nearly circumferentially aligned blades and these blades extend along a helical path with respect to the gear.

It has further been found that where the resin or plastic material applied in the slots is a cured epoxy, the edge surfaces of the resin material intermediate adjacent blades may be recessed slightly inwardly by treating them with a solvent such for example as methylene chloride so as to dissolve the resin away from the cutting edges 38 and 40.

The slotted resin reinforced cutters have material advantages over serrated cutters in certain fields of use. In one important respect, the formation of slots by sawing through the blank or the blank subsequent to tooth formation, is a more rapid and cheaper method of providing cutting edges than is serrating the grooves. Furthermore, by forming slots completely through the teeth and thereafter reinforcing the blades thus produced, it is possible to produce cutting edges more closely adjacent to each other because the blades may be quite thin and yet adequately reinforced by the plastic material.

What we claim as our invention is:

1. A gear shaving cutter in the form of a gear having its teeth slotted transversely to form each tooth into a plurality of axially spaced blades, the spaces between the blades of each tooth being substantially filled with a plastic material bonded to the sides of said blades and reinforcing them against lateral thrust encountered in gear shaving operations.

2. A cutter as defined in claim 1 in which the plastic material is resiliently yieldable under pressure to expose the cutting edges formed at the intersection between the sides and edges of said blades.

3. A cutter as defined in claim 2 in which said plastic material is epoxy resin.

4. A cutter as defined in claim 1 in which said plastic material is recessed slightly inwardly from the edges of said blades to expose the cutting edges formed at the intersection between the sides and edges of said blades.

5. A cutter as defined in claim 1 in which the series of the slots through said teeth are in circumferential alignment to form a multiplicity of axially spaced, interrupted circular slots.

6. A cutter as defined in claim 1 in which the series of the most nearly circumferentially aligned slots are in helical alignment on a small lead.

References Cited

UNITED STATES PATENTS

| | | | |
|---|---|---|---|
| 2,036,656 | 4/1936 | Stowell et al. | 29—103 |
| 2,126,178 | 8/1938 | Drummond | 29—103 |
| 2,325,746 | 8/1943 | Curtis | 29—105 |
| 2,357,088 | 8/1944 | Curtis | 29—103 |
| 2,607,108 | 8/1952 | See | 29—105 |
| 2,680,283 | 6/1954 | See et al. | 29—105 |
| 2,758,363 | 8/1956 | Praeg | 29—105 |
| 2,780,858 | 2/1957 | Robinson | 29—105 |

HARRISON L. HINSON, Primary Examiner